US005753025A

United States Patent [19]

Bettler et al.

[11] Patent Number: 5,753,025
[45] Date of Patent: May 19, 1998

[54] TITANIUM DIOXIDE PIGMENT COATED WITH BORIA-MODIFIED SILICA AND ALUMINA

[75] Inventors: Charles Robert Bettler, Newark; Howard Wayne Jacobson, Wilmington, both of Del.; Michael R. Baloga, Camden, Tenn.; Max H. Lewis, Landenberg, Pa.

[73] Assignee: E. I. du Pont de Nemours and Company, Wilmington, Del.

[21] Appl. No.: 764,770

[22] Filed: Dec. 12, 1996

Related U.S. Application Data

[63] Continuation of Ser. No. 375,836, Jan. 19, 1995, abandoned, which is a continuation-in-part of Ser. No. 337,333, Nov. 9, 1994, abandoned.

[51] Int. Cl.$^6$ ............................................. C09C 1/36
[52] U.S. Cl. ........................... 106/442; 106/446; 428/403; 428/404; 427/214; 427/215; 427/402; 427/419.2; 427/419.3
[58] Field of Search .................................. 106/436, 442, 106/446; 428/357, 402, 403, 404; 427/215, 214, 402, 419.2, 419.3

[56] References Cited

U.S. PATENT DOCUMENTS

| Re. 27,818 | 11/1973 | Werner | 106/300 |
|---|---|---|---|
| 2,885,366 | 5/1959 | Iler | 252/313 |
| 3,437,502 | 4/1969 | Werner | 106/300 |
| 3,515,566 | 6/1970 | Moody et al. | 106/300 |
| 3,859,115 | 1/1975 | Wiseman et al. | 117/70 A |
| 4,075,031 | 2/1978 | Allen | 106/300 |
| 4,125,412 | 11/1978 | West | 106/300 |
| 4,448,609 | 5/1984 | Tear et al. | 106/308 |
| 4,737,194 | 4/1988 | Jacobson | 106/300 |
| 4,781,761 | 11/1988 | Jacobson | 106/446 |
| 5,041,162 | 8/1991 | Brand | 106/446 |
| 5,340,393 | 8/1994 | Jacobson | 106/492 |

*Primary Examiner*—Michael Marcheschi

[57] ABSTRACT

A base $TiO_2$ pigment particles bearing coatings of a boria-modified silica and alumina is disclosed.

7 Claims, No Drawings

5,753,025

TITANIUM DIOXIDE PIGMENT COATED WITH BORIA-MODIFIED SILICA AND ALUMINA

CROSS REFERENCE TO RELATED APPLICATION

This is a continuation of application Ser. No. 08/375,836, filed Jan. 19, 1995, now abandoned, which is a continuation-in-part of application Ser. No. 08/337,333, filed Nov. 9, 1994, now abandoned.

BACKGROUND OF THE INVENTION

This invention relates generally to coated titanium dioxide pigments and more specifically to a rutile $TiO_2$ pigment particles bearing coatings of about 1–4 weight percent $SiO_2$, about 0–0.048 weight percent $B_2O_3$ and about 1–4 weight percent $Al_2O_3$, based on the total pigment weight, and the $TiO_2$ pigment having about 30% by weight or less of particles with a size in excess of 0.6 microns in diameter. The $TiO_2$ pigment exhibits a unique combination of high gloss and excellent durability when incorporated into interior and exterior end-use applications.

Durable pigments are known in the art and are generally prepared by providing $TiO_2$ pigment with a dense metal oxide coating. These pigments are used mainly in exterior applications or in uses that require some resistance to weathering such as temperature, humidity, sunlight and UV radiation. While dense metal oxide coatings such as silica enhance the durability of $TiO_2$ pigment, such coatings are also commonly known to degrade gloss, rendering such pigments unacceptable for use in high gloss interior applications. There is a need for a product which possesses both high gloss and excellent durability when incorporated into interior and exterior end-use applications such as paint formulations. Further, there is a need for a more versatile, economical product, and a product that minimizes boron leaching from the coatings into a surrounding matrix.

The present invention meets these needs.

SUMMARY OF THE INVENTION

In accordance with this invention there is provided a rutile $TiO_2$ pigment before surface treatment having about 30% by weight or less of particles with a size in excess of 0.6 microns in diameter, said $TiO_2$ pigment particles bearing coatings of about 1–4 wt % $SiO_2$, about 0–0.048 wt % $B_2O_3$ and about 1–4 wt % $Al_2O_3$, based on the total pigment weight.

It has been found that the composition of this invention provides a dense silica coating with a low concentration of silica and maintains high durability.

A reduced amount of leachable boron remains in said dense silica and/or alumina coating. Surprisingly, the present composition possesses both high gloss and excellent durability when incorporated into interior and exterior end-use applications. Further, it has been found that oil absorption has been improved over conventional, durable, silica coated $TiO_2$ products.

DETAILED DESCRIPTION

The $TiO_2$ used to prepare the pigment can be of a conventional rutile variety, produced by either a chloride or a sulfate process. Preferably, the $TiO_2$ is prepared by the chloride process. In this process pigmentary $TiO_2$ can be produced by oxidizing $TiCl_4$ in the vapor phase at an oxidation temperature from about 900° C. to 1600° C. with an oxygen containing gas optionally in the presence of an aluminum halide and/or a silicon halide as described in Gonzales, U.S. Pat. No. 5,562,764, the teachings of which are incorporated herein by reference, and a vaporized alkali metal salt. The $TiO_2$ pigment used in the present invention is characterized as having a coarse tail or weight percent of particles greater than 0.6 microns in diameter of about 30% or less, preferably about 25% or less, at a Carbon Black Undertone (CBU), defined hereinbelow, of 10–15 or preferably a CBU of 11–13.

Preferably, the $TiO_2$ used to prepare the pigments of this invention will be base $TiO_2$, i.e., produced by oxidizing $TiCl_4$ to $TiO_2$ and before any surface treatments are applied. The amount of silica which the particles bear as coatings can be from about 1–4 wt % based on total pigment weight, with about 2–3 wt % being preferred. The amount of boron, as $B_2O_3$, contained within the dense silica coating and/or an alumina coating can be from about 0–0.048 wt %, based on the total pigment weight, with 0.024–0.030 wt % boria as $B_2O_3$ being most preferred. If a silicon halide is added during the oxidation process, the amount of silica the particles bear as coatings, expressed as percent by weight, is calculated by first determining the silica content of the coated pigment by any suitable means such as x-ray fluorescence spectroscopy. The silica content of the uncoated rutile $TiO_2$ is similarly determined, and the silica content attributable to the coating is determined by the difference between the coated and uncoated silica contents.

The $TiO_2$ particles of this invention possess an outer coating of alumina. The amount of alumina the particles bear as coatings can be from about 1–4 wt %, based on total pigment weight, with about 1.4 to 2.5 wt % being preferred. If an aluminum halide is added during the oxidation process, the amount of alumina the particles bear as coatings, expressed as percent by weight, is calculated by first determining the alumina content of the coated pigment by any suitable means such as x-ray fluorescence spectroscopy. The alumina content of the uncoated rutile $TiO_2$ is similarly determined, and the alumina content attributable to the coating is determined by the difference between the coated and uncoated alumina contents.

A process for preparing coated $TiO_2$ pigment particles possessing high gloss and high durability is described. After oxidizing $TiCl_4$ in the vapor phase at an oxidation temperature from about 900° C. to 1600° C. with an oxygen containing gas, a hot gaseous suspension of $TiO_2$ solids and free chlorine must be quickly cooled below 600° C. within about 1–60 seconds following discharge of the suspension from a reactor. This cooling can be accomplished in an externally cooled conduit in which good heat transfer can be maintained by minimizing the adherent layers by adding scouring particles or scrubs so that undesired $TiO_2$ particle size growth is prevented and particle agglomeration is minimized. To prepare such a $TiO_2$ pigment base with a coarse tail of 30% or less, a preferred cooling conduit is a flue having a plurality of substantially longitudinal protuberances, depressions or both, as described in U.S. Pat. No. 4,937,064, the teachings of which are incorporated herein by reference. An alternative embodiment in preparing the $TiO_2$ base is use of a conventional conduit and decreasing the $TiO_2$ output. Other factors leading to a $TiO_2$ base with a coarse tail of 30% or less will be dependent upon reactor configuration or addition of quenching gases or liquids.

The $TiO_2$ pigment exiting the cooling conduit is used to prepare an aqueous slurry containing 200–450 grams per liter $TiO_2$. To this slurry is added a metal borate salt, preferably sodium metaborate. This slurry is heated to 65° C. to 90° C. and held at that temperature throughout the remainder of the preparation procedure. The slurry is adjusted to a pH of 8–11, preferably about pH 10, by the addition of a sufficient quantity of base, especially an aqueous caustic solution. An aqueous solution of a silica source (alkali metal silicate), especially potassium or sodium silicate, is then added over a period of time of about 5 minutes to the TiO$_2$ slurry. The pH is adjusted to about 3–8 preferably a pH of 7 by addition of an acid, normally hydrochloric or sulfuric, particularly dilute hydrochloric acid over a period of typically two hours. A concentrated HCl may be used if good mixing or agitation is available. As acid is added, SiO$_2$/B$_2$O$_3$ will be deposited and densified on the surfaces of the TiO$_2$ particles. The pigment is then cured at 65° C. to 90° C. for about 15–30 minutes.

To effect an alumina outer coating on the silica/boria coated TiO$_2$ particles, a sufficient amount of a metal aluminate, preferably sodium aluminate, is slowly added to the TiO$_2$ slurry at a temperature of 65° C. to 90° C. after the silica/boria coating has been cured. Acid, normally hydrochloric or sulfuric, is simultaneously added to maintain the pH of the slurry within the range of about 6–9, preferably a pH of 7, as to effect deposition of an alumina or alumina/boria coating. After addition of aluminate is complete, the slurry is allowed to cure, with continuous stirring, for 15–30 minutes. The compositions of the coating solutions can be varied as required to provide variation in coating weight and composition. Optionally, the coated pigment can undergo fluid energy operations such as media milling, as described in OTT et al., U.S. Pat. No. 5,356,420, the teachings of which are incorporated herein by reference, either before or after said surface coatings treatment.

The resulting pigment is then separated from the liquid by filtration or centrifugation. The pigment is washed with deionized water or water until substantially free from salts. This washing step also provides an ultimate boria concentration of about 0–0.048 wt %, preferably about 0.016–0.048 wt % and more preferably about 0.024–0.030 wt %, based on the total pigment weight. A low concentration of silica reduces the amount of boria capable of being associated with silica, and a dense silica coating may be produced at lower temperatures, e.g., 65° C. to 80° C.

The pigment product is dried and sieved, then subjected to grinding to achieve the desired particle size. Grinding may be accomplished by using a steam micronizer at a steam to pigment ratio of up to 10 to 1, preferably in the presence of a dispersant. Dispersants can be organic or inorganic as described in U.S. Pat. No. 3,549,091, the teachings of which are incorporated herein by reference. Organic dispersants are particularly preferred such as liquid and solid polyols, i.e., low molecular weight polyglycol and trimethylolpropane (TMP), liquid polyphosphates, liquid hydroxy amines, i.e., triethanolamine (TEA) and liquid and solid styrene-maleic anhydride copolymers and the like. Especially preferred is trimethylolpropane (TMP), triethanolamine (TEA), 2-amino 2-methyl 1-propanol (AMP), tetrapotassium pyrophosphate (TKPP) or the like.

TiO$_2$ pigment products are tested for Carbon Black Undertone (CBU), a measure of particle size uniformity that depends to a certain extent on the amount of particles present as agglomerates. Generally, the higher the CBU, the smaller the particles. A typical CBU for TiO$_2$ used in paint is about 10–12. CBU is determined by mulling together a suitable liquid, such as light colored oil and standard weights of the sample and a standard carbon black. The mixture is spread on a panel and the relative blueness of the gray mixtures observed. Fine particles give bluer undertone or higher CBU. CBU is described in greater detail in U.S. Pat. No. 2,488,440, the teachings of which incorporated herein by reference except using a reference value of 10 rather than 100 as used therein.

Particle size of the pigment products is measured by sedimentation analysis, with a SEDIGRAPH® (Micromeritics Instrument Corp., Norcross, Ga.) after dispersion in aqueous suspension by fixed level sonication. The percent greater than 0.6 microns fraction is a measure of agglomeration and of the potential for gloss in the finished product, a value that cannot be exceeded while applying any reasonable grinding energy level.

Particle surface area of the final coated product correlates with oil absorption of pigments and aids in paint formulation. The oil absorption value obtained gives information about the vehicle demand of the pigment when it is used in a pigment paste. Typically, a low surface area of the final coated product, and hence a low oil absorption value, is a good indicator to a paint formulator of a wet-in of a pigment.

A Catalytic Activity Coefficient (CAC) is a measure of durability based on ultraviolet reactivity of TiO$_2$ pigment in a test based on TiO$_2$ catalyzed reduction of lead carbonate to the metal. An air-seal dispersion of non-durable TiO$_2$ and lead carbonate in an organic medium turns from white to almost black by exposure to ultraviolet light. With durable TiO$_2$ pigments the paste turns light gray. A drop of a paste of basic lead carbonate, glycerol, fumed silica, and TiO$_2$ pigment is put between two glass microscope slides and exposed to ultraviolet light for about 5 hours. The darkness of these slides is compared to Munsell chips and the CAC values determined. The CAC decreases as durability increases. The CAC is described in greater detail in J. Braun, "TiO$_2$'s Contribution to the Durability and Degradation of Paint Film II. Prediction of Catalytic Activity", 62 *Journal of Coating Technology*, pp. 37–42 (1990), the teachings of which are incorporated herein by reference.

To give a clearer understanding of the invention, the following Examples are construed as illustrative and not limitative of the underlying principles of the invention in any way whatsoever.

EXAMPLES

EXAMPLE 1

In a 15 liter glass jar, 3000 grams of a base TiO$_2$ pigment having a coarse tail of 25.1% was added to 12 liters of deionized water. 23.7 grams of sodium metaborate was added to the dispersed base TiO$_2$ pigment. The system was on a hot plate and then heated to 90° C.

While stirring the dispersed TiO$_2$ in the glass jar, the pH was increased to 10.2 by the addition of 20% NaOH. 377 grams of #6 KSil solution, (available from Philadelphia Quartz Co., Baltimore, Md.) 25% SiO$_2$, was added to the bath over a 5 minute period. While stirring, the pH was decreased to 7.0 over a 2 hour period by the slow addition of concentrated HCl solution. The HCl addition rate was approximately 2 ml/min. This procedure effected a SiO$_2$ coating in the presence of borate. The system was then cured for 15 minutes.

Over a 25 minute period, 146 ml of sodium aluminate, (available from Vinings Corporation, Marietta, Ga.) was added to the bath and neutralized with concentrated HCl at pH=8 to effect an alumina coating. The system was cured for 15 minutes at pH 8. It was then filtered on a Buchner funnel and washed substantially free of dissolved salts. The coated, filtered and washed product was then dried overnight at 120° C. in a vacuum oven. It was then passed through a #20 sieve to eliminate large clumps. The product was then passed through an eight inch steam micronizer at a 3:1 ratio of steam:pigment.

An emulsion gloss of a 27% pigment volume concentration emulsion paint made with RHOPLEX® AC-388 (Rohm and Haas, Philadelphia, Pa.) acrylic emulsion was measured at a reflectance angle of 60°. A drawdown of the paint was made on black PVC panels, followed by drying the panels for 3 hours in a constant temperature, constant humidity (CTCH) cabinet, measuring 60 degree gloss using a Hunter gloss meter (available from Hunter Laboratories, Reston, Va.), and calculating gloss in relation to reflectance values of the standards. The product had a gloss value of 48.

The product had a surface area of 10.2 m$^2$/g. The CAC was 0.06. The CBU was about 12. The product pigment contained 3.0% silica based on total pigment weight as determined by X-ray fluorescence spectroscopy of the particles and 0.0166% boria ($B_2O_3$) as determined by ICP analysis of the solution of the coating after dissolving in hot dilute caustic. The total alumina content in the pigment was 2.4% (1.55 wt % as a coating) as determined by X-ray fluorescence spectroscopy of the particles.

EXAMPLE 2

The procedure of Example 1 was repeated with a base TiO$_2$ pigment having a coarse tail of 22.2%. The product had a surface area of 9.9 m$^2$/g, and emulsion gloss of 55. The CAC was 0.06. The CBU was about 12. The product contained 3.1% silica, 0.017% boria and 2.5% (1.65% as coating) alumina based on total pigment weight determined in the same manner as in Example 1.

EXAMPLE 3

The procedure of Example 1 was repeated with a base TiO$_2$ pigment having a coarse tail of 25.1% with the exception that after the pigment was dried in the vacuum oven, it was blended in a U-blender with 0.5% trimethylolpropane (TMP). After blending, the pigment was passed through a #20 sieve to eliminate large clumps. The product was then passed through an eight inch steam micronizer at a 3:1 ratio of steam:pigment. The product had a surface area of 10.2 m$^2$/g, and emulsion gloss of 53. The CAC was 0.07. The CBU was about 12. The product contained 3.1% silica, 0.0173% boria and 2.4% (1.55% coating) alumina based on total pigment weight determined in the same manner as in Example 1.

EXAMPLE 4

The procedure of Example 3 was repeated with a base TiO$_2$ pigment having a coarse tail of 22.2%. The product had a surface area of 10.6 m$^2$/g, and emulsion gloss of 58. The CAC was 0.07. The CBU was about 12. The product contained 3.1% silica, 0.0179% boria and 2.5% (1.65% as coating) alumina based on total pigment weight determined in the same manner as in Example 1.

Having thus described and exemplified the invention with a certain degree of particularity, it should be appreciated that the following Claims are not to be limited but are to be afforded a scope commensurate with the wording of each element of the Claims and equivalents thereof.

We claim:

1. A process for making a rutile TiO$_2$ pigment suitable for use in making coating formulations having improved gloss, comprising the steps of:

a) preparing uncoated TiO$_2$ particles, wherein no greater than about 30% by weight of the uncoated TiO$_2$ particles have a diameter size in excess of 0.6 microns, and b) coating the uncoated TiO$_2$ particles with coatings of about 1–4 percent by weight SiO$_2$, about 0–0.048% percent by weight B$_2$O$_3$, and about 1–4 percent by weight Al$_2$O$_3$, based on total pigment weight to form a rutile TiO$_2$ pigment comprising coated TiO$_2$ particles.

2. The process of claim 1, wherein the coating of SiO$_2$ is about 2–3 percent by weight, the coating of B$_2$O$_3$ is about 0.024–0.030 percent by weight, and the coating of Al$_2$O$_3$ is about 1.4–2.5 percent by weight.

3. The process of claim 1, wherein the coatings are formed by:

a) adding a metal borate salt and an alkali metal silicate to a slurry of TiO$_2$ particles to form a coating of SiO$_2$ and B$_2$O$_3$ on the TiO$_2$ particles, and b) adding a metal aluminate to the slurry of TiO$_2$ particles after the coating of SiO$_2$ and B$_2$O$_3$ has been cured to form a coating of Al$_2$O$_3$ on the SiO$_2$ and B$_2$O$_3$ coated TiO$_2$ particles thus forming a TIO$_2$ pigment slurry.

4. The process of claim 1, wherein no greater than about 25% by weight of the uncoated TiO$_2$ particles have a diameter size in excess of 0.6 microns.

5. The process of claim 3, wherein the TiO$_2$ pigment slurry formed is media-milled to provide a TiO$_2$ pigment comprising TiO$_2$ particles having coatings of silica, about 0.016 to 0.048 wt. % boria, and alumina.

6. The process of claim 3, wherein the TiO$_2$ pigment slurry formed is media-milled to provide a TiO$_2$ pigment comprising TiO$_2$ particles having coatings of silica, about 0.024 to 0.030 wt. % boria, and alumina.

7. process of claim 5 or claim 6, further comprising the step of drying the TiO$_2$ pigment and grinding the TiO$_2$ pigment in the presence of a dispersant selected from the group consisting of trimethylolpropane, triethanolamine, 2-amino 2-methyl 1-propanol, and tetrapotassium pyrophosphate.

* * * * *